(12) United States Patent
Ward et al.

(10) Patent No.: US 10,291,464 B1
(45) Date of Patent: *May 14, 2019

(54) SEPARATION OF CONTROL PLANE FUNCTIONS USING VIRTUAL MACHINES IN NETWORK DEVICE

(71) Applicant: Juniper Networks, Inc., Sunnyvale, CA (US)

(72) Inventors: David Ward, Los Gatos, CA (US); Mu Lin, Sunnyvale, CA (US); Sriram Raghunathan, Cupertino, CA (US); Zi Zhou, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 56 days.

This patent is subject to a terminal disclaimer.

(21) Appl. No.: 15/429,300

(22) Filed: Feb. 10, 2017

Related U.S. Application Data

(63) Continuation of application No. 14/614,123, filed on Feb. 4, 2015, now Pat. No. 9,571,388, which is a
(Continued)

(51) Int. Cl.
*H04L 12/24* (2006.01)
*H04L 12/741* (2013.01)
(Continued)

(52) U.S. Cl.
CPC .......... *H04L 41/0663* (2013.01); *H04L 45/22* (2013.01); *H04L 45/54* (2013.01); *H04L 45/586* (2013.01); *H04L 67/2861* (2013.01)

(58) Field of Classification Search
CPC .................................................. H04L 41/0663
See application file for complete search history.

(56) References Cited

U.S. PATENT DOCUMENTS 7,606,241 B1   10/2009   Raghunathan et al.
8,369,345 B1   2/2013    Raghunathan et al.
(Continued)

OTHER PUBLICATIONS

Prosecution History from U.S. Appl. No. 13/732,114, dated Jun. 25, 2014 through Nov. 13, 2014, 33 pp.
(Continued)

*Primary Examiner* — Jason E Mattis
(74) *Attorney, Agent, or Firm* — Shumaker & Sieffert, P.A.

(57) ABSTRACT

Techniques are described for separating control plane functions in a network device using virtual machines. The techniques include initializing multiple virtual machine instances in a control unit of a standalone router, and running different control processes for the router in each of the virtual machines. For example, in a root system domain (RSD)-protected system domain (PSD) system, a control unit of the standalone router may support a RSD virtual machine (VM) and one or more PSD VMs configured to form logical devices and execute logically separate control processes without requiring physically separate, hardware-independent routing engines to form the PSDs. Each of the RSD VM and PSD VMs includes a separate kernel, an operating system, and control processes for the logical device. When a software failure occurs in the PSD VM, the PSD VM may perform a software failover without affecting the operation of the RSD VM.

18 Claims, 7 Drawing Sheets

Related U.S. Application Data continuation of application No. 13/732,114, filed on Dec. 31, 2012, now Pat. No. 8,953,439.

(51) Int. Cl.
  *H04L 29/08* (2006.01)
  *H04L 12/707* (2013.01)
  *H04L 12/713* (2013.01)

(56) References Cited

U.S. PATENT DOCUMENTS

| | | |
|---|---|---|
| 8,953,439 B1 * | 2/2015 | Lin ................ G06F 11/1484 370/218 |
| 9,571,388 B1 | 2/2017 | Ward et al. |
| 2009/0327392 A1 * | 12/2009 | Tripathi ............. G06F 15/16 709/201 |
| 2011/0019531 A1 | 1/2011 | Kim et al. |
| 2011/0103389 A1 * | 5/2011 | Kidambi ............ H04L 45/586 370/395.1 |
| 2011/0134931 A1 | 6/2011 | Merwe et al. |
| 2011/0246986 A1 | 10/2011 | Nicholas et al. |
| 2012/0185688 A1 | 7/2012 | Thornton et al. |
| 2013/0034109 A1 | 2/2013 | Cardona et al. |
| 2013/0114613 A1 * | 5/2013 | Deshpande .......... H04L 45/586 370/401 |
| 2013/0142048 A1 | 6/2013 | Gross et al. |
| 2013/0346470 A1 | 12/2013 | Obstfeld et al. |

OTHER PUBLICATIONS

Prosecution History from U.S. Appl. No. 14/614,123, dated Apr. 28, 2016 through Oct. 5, 2016, 31 pp.

\* cited by examiner

SEPARATION OF CONTROL PLANE FUNCTIONS USING VIRTUAL MACHINES IN NETWORK DEVICE

PRIORITY CLAIM

This application is a continuation of U.S. patent application Ser. No. 14/614,123, filed Feb. 4, 2015, which is a continuation of U.S. patent application Ser. No. 13/732,114, filed Dec. 31, 2012. The entire contents of both Ser. No. 14/614,123 and Ser. No. 13/732,114 are incorporated herein by reference.

TECHNICAL FIELD

The invention relates to computer networks and, more particularly, to systems for routing packets within the networks.

BACKGROUND

A computer network is a collection of interconnected network devices that can exchange data and share resources. In a packet-based network, such as an Ethernet network, the network devices communicate data by dividing the data into small blocks called packets, which are individually routed across the network from a source device to a destination device. The destination device extracts the data from the packets and assembles the data into its original form.

The network devices may include routers, security appliances, network switches, wireless access points, or the like. Routers, for example, maintain tables of routing information that describe routes through the network. A "route" can generally be defined as a path between two locations on the network. Upon receiving an incoming data packet, the router examines destination information within the packet to identify the destination for the packet. Based on the destination, the router forwards the packet in accordance with the routing table.

A network device, such as a router, may include two separate processing planes, a control plane and a forwarding plane. The control plane includes a routing engine that provides an operating environment for a host operating system (OS) and control processes that run network management software, execute routing protocols to communicate with peer routers, maintain and update one or more routing tables, create one or more forwarding tables for installation in the forwarding plane, and manage packet forwarding components, among other functions. For example, a management daemon (MGD), a device configuration daemon (DCD), a routing protocol daemon (RPD), and a chassis management daemon (ChassisD) may all execute in the routing engine using the same kernel. If a kernel panic, error, or trap occurs, which is typically caused by a routing control portion of the code executed by the routing engine, operation of all of the control processes executing in the routing engine may be halted. That is, in this case, a kernel panic caused by a software failure may cause a complete loss of functionality provided by the hardware processing environment in the routing engine and may even trigger a switchover to backup hardware components included in the routing engine.

One solution is to execute the separate control processes in hardware-independent routing engines within a control system physically coupled to a standalone router in a root system domain (RSD)-protected system domain (PSD) system. Each of the routing engines of the control system includes a separate kernel over which to run a separate OS and control processes, such as one or more of MGD, DCD, RPD and ChassisD. In this case, the packet forwarding components of the standalone router are logically partitioned into multiple groups, and each group is assigned to a different one of the routing engines of the control system to form a separate PSD. The routing engine of the standalone router, often referred to as a RSD, maintains control over any remaining forwarding components of the standalone router that are not assigned to one of the PSDs. The RSD-PSD system, however, require a separate physical switch to facilitate communication between the standalone router and the plurality of routing engines located out-of-box in the control system.

SUMMARY

In general, techniques are described for fine-grain separation of control plane functions in a network device using virtual machines. The techniques include initializing multiple virtual machine instances in a control plane of a standalone router, and running different control processes for the router in each of the virtual machines. For example, in a root system domain (RSD)-protected system domain (PSD) system, a control unit of the standalone router may support a RSD virtual machine (VM) and one or more PSD VMs configured to form logical devices and execute logically separate control processes without requiring physically separate, hardware-independent routing engines to form the PSDs. Each virtual machine may include its own kernel with a separate guest operating system over which may run one or more control processes. The processes running in the different virtual machines may communicate with each other via a shared memory, a shared network interface, a bridge or tap device, a virtual distributed switch, or another virtual machine communication interface managed by a hypervisor. The processes running in the different virtual machines may communicate with processes and hardware in the forwarding plane via their individual kernels and the hypervisor.

According to the techniques, when a software failure causes a kernel panic in one of the PSD VMs, for example, only the kernel in that PSD VM panics and the PSD VM may perform a failover without affecting the operation of the control processes in the other PSD VMs or the RSD VM. By separating the control plane functions across multiple virtual machines, software failures in one of the virtual machines do not dictate costly hardware switchovers within the standalone router that require redundant hardware and sophisticated software implementations. In addition, separating the control plane functions across multiple virtual machines enables hardware isolation of the control plane and greater control plane scaling.

In some cases, the techniques are used to separate chassis management from routing control in the control plane of the same standalone router. Specifically, the hypervisor may initialize a RSD VM and one or more PSD VMs, each including a kernel with a guest operating system (OS), and a routing protocol daemon (RPD) that controls routing functionality for the logically separate routers. In addition, the hypervisor may initialize a separate chassis VM including a kernel with a guest OS, and a chassis management daemon (ChassisD) that manages packet forwarding components for the logically separate routers. In this case, each of the RSD VM and PSD VMs may include a ChassisD shell to facilitate management of the packet forwarding components via the ChassisD running in the separate chassis VM.

In one example, a method comprises initializing a first virtual machine in a control unit of a network device that operates as a logically separate routing engine assigned to one or more packet forwarding components of the network device to form a logical device, the first virtual machine including a first kernel with a first guest operating system, and a first set of control processes for the logical device, initializing a second virtual machine in the control plane of the network device that operates as a routing engine for the network device, the second virtual machine including a second kernel, a second guest operating system, and a second set of control processes for the network device and to map assignments of the packet forwarding components to the first virtual machine, and, when a software failure occurs in the first virtual machine, performing a failover of the first virtual machine without affecting the second virtual machine.

In another example, a network device comprises a control unit including a processor configured to initialize a first virtual machine that operates as a logically separate routing engine assigned to one or more packet forwarding components of the network device to form a logical device, the first virtual machine including a first kernel, a first guest operating system, and a first set of control processes for the logical device, initialize a second virtual machine that operates as a routing engine for the network device, the second virtual machine including a second kernel with a second guest operating system, and a second set of control processes for the network device and to map assignments of the packet forwarding components to the first virtual machine, and, when a software failure occurs in the first virtual machine, perform a failover of the first virtual machine without affecting the second virtual machine, and a forwarding engine including the packet forwarding components connected to the control unit.

In a further example, the disclosure is directed to a computer-readable medium comprising instructions executed in a network device that cause a programmable processor to initialize a first virtual machine in a control unit of the network device that operates as a logically separate routing engine assigned to one or more packet forwarding components of the network device to form a logical device, the first virtual machine including a first kernel with a first guest operating system, and a first set of control processes for the logical device, initialize a second virtual machine in the control plane of the network device that operates as a routing engine for the network device, the second virtual machine including a second kernel, a second guest operating system, and a second set of control process for the network device and to map assignments of the packet forwarding components to the first virtual machine, and, when a software failure occurs in the first virtual machine, perform a failover of the first virtual machine without affecting the second virtual machine.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
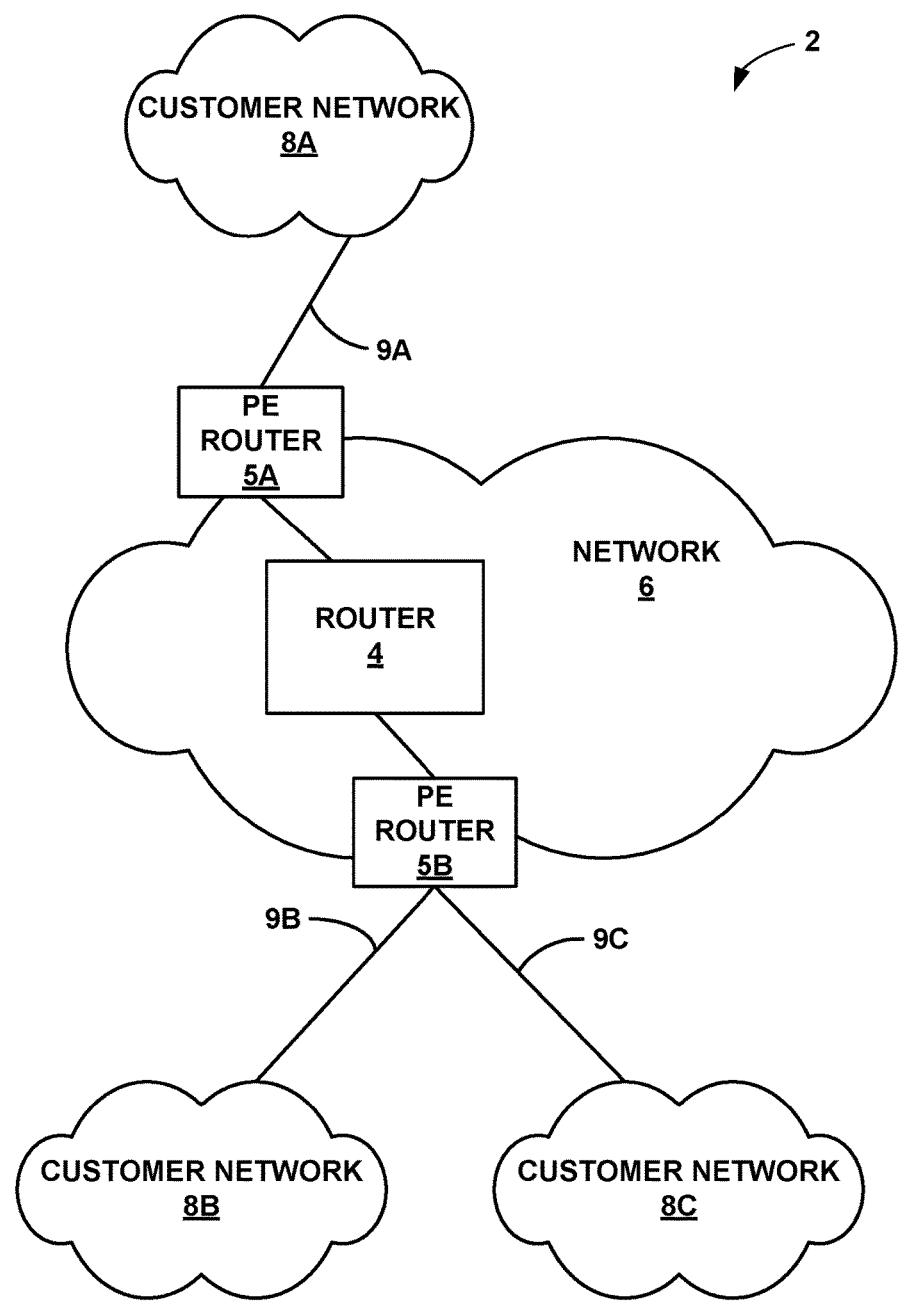
FIG. 1 is a block diagram illustrating an example network system including a network with at least one router capable of separating control plane functions using multiple virtual machine instances in accordance with the techniques of this disclosure.

FIG. 1 is a block diagram illustrating an example network system 2 including a network 6 with at least one router 4 capable of separating control plane functions using multiple virtual machine instances in accordance with the techniques of this disclosure. In this example, router 4 communicates with provider edge (PE) routers 5A and 5B ("PE routers 5") that provide customer networks 8A-8C ("customer networks 8") with access to network 6. Network 6 may be a service provider network coupled to one or more other networks, and may thus form part of a large-scale public network infrastructure, e.g., the Internet. Consequently, customer networks 8 may be viewed as edge networks of the Internet. The service provider may provide computing devices within customer networks 8 with access to the Internet via network 6.

In the illustrated embodiment, PE router 5A is coupled to customer network 8A via access link 9A and PE router 5B is coupled to customer networks 8B and 8C via access links 9B and 9C, respectively. In some examples, customer networks 8 may be networks for geographically separated sites of an enterprise connected through network 6. In other examples, customer networks 8 may be individual business or home networks connected to the Internet through network 6. Each of customer networks 8 may include one or more computing devices (not shown), such as personal computers, laptop computers, handheld computers, workstations, servers, switches, printers, or other devices. The configuration of network system 2 illustrated in FIG. 1 is merely exemplary. For example, network 6 may be coupled to any number of customer networks 8. Nonetheless, for ease of description, only customer networks 8A-8C are illustrated in FIG. 1.

In this example, router 4 is connected to PE routers 5 by physical links. For example, the physical links may be a physical medium, such as a copper wire, a coaxial cable, any of a host of different fiber optic lines, or a wireless connection. In some cases, network 6 may be a Multi-protocol Label Switched (MPLS) network that has been traffic engineered to include multiple label switched paths (LSPs) for controlling the flow of traffic through network 6. In other examples, network 6 may include a variety of network devices other than router 4 and PE routers 5, such as additional routers, switches, servers, security appliances, wireless access points, and the like.

The architecture of router 4 may be viewed as two logically separate processing planes, a control plane and a forwarding plane. The control plane provides an operating environment for a host operating system (OS) and one or more control processes that run network management software, execute routing protocols to communicate with peer routers, maintain and update one or more routing tables, create one or more forwarding tables for installation in the forwarding plane, and manage packet forwarding components in the forwarding plane, among other functions.

In a conventional router, the control processes all run on the control plane using the host OS and interact with the forwarding plane using a single, shared kernel. In this case, if a software failure occurs in the control plane, all of the control processes executing on the control plane will be taken down. For example, kernel panic is typically caused by a software failure of the routing control portion of the code executed on the control plane. When all the control processes share the same kernel, the kernel panic causes all the control processes to fail, including the control process configured to manage the packet forwarding components. In this case, the software failure may cause a complete hardware failure in a control plane of the router or may trigger a hardware switchover to redundant hardware components in the router.

One solution is to execute the separate control processes in hardware-independent routing engines within a control system physically coupled to a standalone router, such as in a root system domain (RSD)-protected system domain (PSD) system. Each of the routing engines of the control system includes a separate kernel with a separate OS over which to run one or more of the control processes. In this case, the packet forwarding components of the standalone router are logically partitioned into multiple groups, and each group is assigned to a different one of the routing engines of the control system. The control processes running in each of the routing engines interact with the forwarding plane of the standalone router using the separate kernel of the respective routing engine. A routing engine of the standalone router maps the packet forwarding component groups to the routing engines of the control system, and performs control processes for the standalone router. The RSD-PSD system, however, requires a separate physical switch to facilitate communication between the routing engine of the standalone router and the plurality of routing engines located out-of-box in the control system. This example is described in more detail with respect to FIG. 2.

According to the techniques of this disclosure, router 4 is configured to separate control plane functions using multiple virtual machine instances. A hypervisor included in the control plane of router 4 initializes multiple virtual machine instances in which to run different control processes for router 4. Each virtual machine includes its own kernel with a separate guest operating system over which to run one or more of the control processes. The processes running in the different virtual machines may communicate with each other via a shared memory, a shared network interface, a bridge or tap device, a virtual distributed switch, or another virtual machine communication interface managed by the hypervisor. The processes running in the different virtual machines may communicate with processes and hardware in the forwarding plane via their individual kernels and the hypervisor.

For example, in the case of a RSD-PSD system, the hypervisor in the control plane of router 4 may initialize a RSD virtual machine (VM) and one or more PSD VMs configured to execute logically separate control processes without requiring physically separate, hardware-independent routing engines to form the PSDs. According to the techniques, when a software failure causes a kernel panic in one of the PSD VMs, for example, only the kernel in that PSD VM panics and the PSD VM may perform a failover without affecting the operation of the control processes in the other PSD VMs or the RSD VM. By separating the control plane functions across multiple virtual machines, software failures in one of the virtual machines do not dictate costly hardware switchovers within standalone router 4 that require redundant hardware and sophisticated software implementations. In addition, separating the control plane functions across multiple virtual machines enables hardware isolation of the control plane and greater control plane scaling within standalone router 4.

In another example, the techniques are used to separate chassis management from routing control in the control plane of router 4. Specifically, the hypervisor may initialize a RSD VM and one or more PSD VMs, each including a kernel with a guest operating system (OS) and a routing protocol daemon (RPD) that controls routing functionality for the logically separate routers. In addition, the hypervisor may initialize a separate chassis VM including a kernel with a guest OS and a chassis management daemon (ChassisD) that manages packet forwarding components for the logically separate routers. In this case, each of the RSD VM and PSD VMs may include a ChassisD shell to facilitate management of the packet forwarding components via the ChassisD running in the separate chassis VM.

Figure 2:
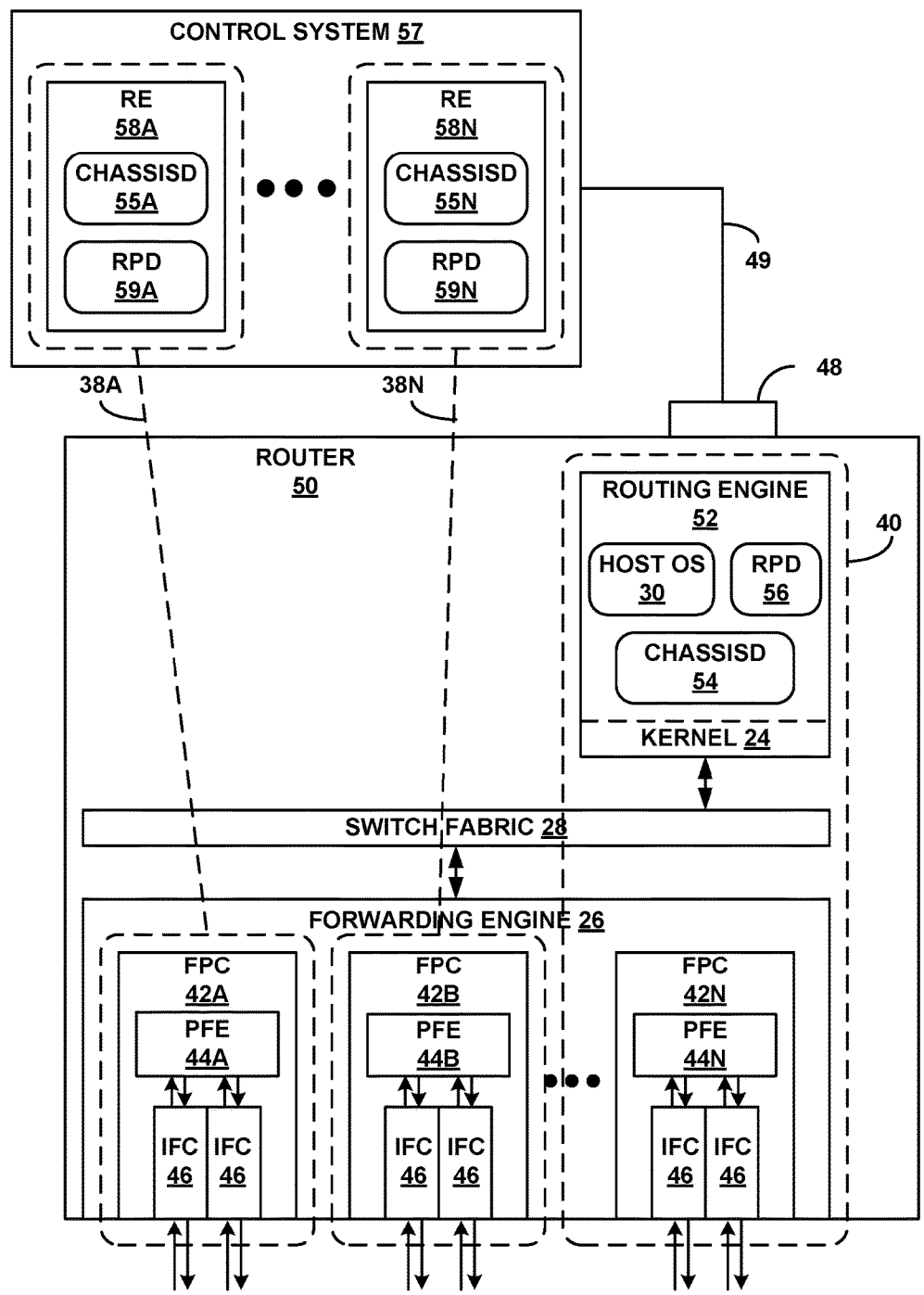
FIG. 2 is a block diagram illustrating an example of a standalone router connected to an external control system capable of separating control plane functions across hardware-independent components.

FIG. 2 is a block diagram illustrating an example of a standalone router 50 connected to an external control system 57 capable of separating control plane functions across hardware-independent components, i.e., routing engines 58A-58N. Router 50 and control system 57 comprise a root system domain (RSD)-protected system domain (PSD) system.

As illustrated in FIG. 2, router 50 includes a routing engine 52 that provides control plane functionality for router 50, and a forwarding engine 26 that provides forwarding functionality for router 50. Router 50 may also include a switch fabric 28 that provides an internal interface between routing engine 52 and packet forwarding components of forwarding engine 26. In addition, switch fabric 28 interconnects packet forwarding components in forwarding engine 26, including a set of flexible packet interface card ("PIC") concentrators 42A-42N ("FPCs 42"), each of which includes at least one of packet forwarding engines 44A-44N ("PFEs 44") that send and receive traffic by a set of interface cards ("IFCs") 46 that typically have one or more physical network interfaces (i.e., ports).

Packet forwarding components of forwarding engine 26, including FPCs 42 and components included in FPCs 42, and switch fabric 28 collectively provide a forwarding plane for forwarding transit network traffic. Although not shown in FIG. 2, PFEs 44 may each comprise a central processing unit (CPU), memory and one or more programmable packet-forwarding application-specific integrated circuits (ASICs). Switch fabric 28 provides a high-speed interconnect for forwarding incoming data packets between PFEs 44 for transmission over a network.

In the control plane, router 50 includes routing engine 52 and control system 57 coupled to router 50. Routing engine 52 of router 50 provides an operating environment for host OS 30 and daemons, including a chassis management daemon (ChassisD) 54 and a routing protocol daemon (RPD) 56, that perform one or more control processes over kernel 24. In general, daemons comprise user-level control processes that run network management software, execute routing protocols to communicate with peer routers, maintain and update one or more routing tables, and create one or more forwarding tables for installation to PFEs 44, among other functions. In the example illustrated in FIG. 3, routing engine 52 includes ChassisD 54 and RPD 56. In other embodiments, routing engine 52 may comprise other daemons or software modules.

ChassisD 54 and RPD 56 operate over and interact with kernel 24, which provides a run-time operating environment for the control processes. Kernel 24 may comprise, for example, a UNIX operating system derivative such as Linux or Berkeley Software Distribution (BSD). Kernel 24 offers libraries and drivers by which ChassisD 54 and RPD 56 may interact with the underlying system. Kernel 24 comprises a kernel-level library, e.g., a sockets library, by which ChassisD 54, RPD 56, and other control processes or user-level libraries may interact with PFEs 44.

Control system 57 provides on operating environment for multiple hardware-independent routing engines 58A-58N (collectively "REs 58"). Control system 57 may comprise a separate, external chassis having a computing backplane into which multiple physically separate computing blades may be inserted. Each of REs 58 comprises a processor-based operating environment for a host OS (not shown) and daemons, including one of ChassisDs 55A-55N and RPDs 59A-59N, that perform one or more control processes over a separate kernel. Control system 57 is connected to router 50 via a high-speed communication cable 49 (e.g., an optical Ethernet cable) and a physical switch 48. In this way, each of REs 58 may communicate with routing engine 52 and other components of router 50. Additional information regarding multi-chassis routers is available in EXTENDING STANDALONE ROUTER SYNTAX TO MULTI-CHASSIS ROUTERS, U.S. Pat. No. 7,606,241, filed Oct. 20, 2009, which is incorporated herein by reference in its entirety.

In the RSD-PSD architecture illustrated in FIG. 2, REs 58 in control system 57 may each be assigned to one or more of FPCs 42 to form separate PSDs 38A-38N ("PSDs 38"). To form the PSDs 38, the FPCs 42 in forwarding engine 26 of router 50 are logically partitioned into multiple groups including at least one of the FPCs 42, and each of REs 58 is assigned control over a particular group of FPCs 42 to form a logically separate router. For example, RE 58A is assigned to FPC 42A to form PSD 38A, and RE 58N is assigned to FPC 42B to form PSD 38N. Routing engine 52 of router 50 running host OS 30 maintains control over any remaining FPCs 42 in forwarding engine 26 that are not assigned to one of REs 58, and is referred to as a RSD 40. For example, routing engine 52 is linked to FPC 42N, which is not assigned to any of REs 58 in control system 57, to form RSD 40. Additional information regarding RSD-PSD systems is available in MULTI-ROUTER SYSTEM HAVING SHARED NETWORK INTERFACES, U.S. application Ser. No. 12/618,536, filed Nov. 13, 2009, which is incorporated herein by reference in its entirety.

Each of REs 58 in control system 57 includes one of ChassisDs 55 that manages the physical configuration of the packet forwarding components included in the FPCs 42 assigned to its corresponding one of PSDs 38. For example, each of the REs 58 may use its ChassisD to recognize the PFEs 44 for the FPCs 42 of the PSD, bring the recognized PFEs 44 to a functional state, and set up logical interfaces for the PFEs 44.

Each of REs 58 also controls packet forwarding functions for its corresponding one of PSDs 38. For example, each of REs 58 includes one of RPDs 59 that performs a routing control process by executing one or more routing protocols to exchange routing information with other network devices, and maintain and update separate routing information for FPCs 42 in its PSD. REs 58 also use the routing information to derive forwarding information for the respective PSDs 38 to which the RE is assigned. Each of REs 58 installs forwarding tables in the PFEs 44 for each of the FPCs 42 that is logically assigned to its PSD based on the forwarding information. In this way, each of FPCs 42 only includes forwarding state for the PSD to which it is assigned. Each of REs 58 communicates directly with the FPCs 42 assigned to its PSD via their individual kernels, cable 49, and physical switch 48 in order to install the forwarding tables in PFEs 44 for the FPCs 42.

Routing engine 52 of router 50 includes ChassisD 54 that manages the physical configuration of the packet forwarding components included in the unassigned FPCs 42. For example, routing engine 52 may use ChassisD 54 to recognize the PFEs 44 for the unassigned FPCs 42, bring the recognized PFEs 44 to a functional state, and set up logical interfaces for PFEs 44. In addition, ChassisD 54 maintains information regarding the PSDs, including mapping the REs 58 in control system 57 to the corresponding FPCs 42.

Routing engine 52 of router 50 also controls packet forwarding functions for any of FPCs 42 that are not assigned to a PSD. Control unit 52 includes RPD 56 that executes one or more routing protocols to exchange routing information with other network devices, and maintain and update routing information for any unassigned FPCs 42. RPD 56 generates forwarding information based on its locally maintained routing information and installs a forwarding table into PFEs 44 for any of FPCs 42 that routing engine 52 owns due to the FPCs not being assigned to a PSD.

In general, RPDs 56 and 59 execute one or more interior and/or exterior routing protocols to exchange routing information with other network devices, maintain and update routing information based on received information, and derive forwarding information based on the routing information. For example, each of the RPDs 56, 59 may implement a protocol to establish at least one routing communication session with neighboring routers in a network in order to exchange routing information. Based on the learned routing information, the RPD maintains and updates routing information to describe a topology of the network, and more particularly, routes through the network. Each of RPDs 56, 59 analyzes its stored routing information and generates forwarding information for PFEs 44 in forwarding engine 26.

ChassisDs 54 and 55 manage the physical configuration of the hardware components included in the chassis of router 50. In the example of FIG. 2, the chassis of router 50 includes the set of FPCs 42, each of which includes at least one of PFEs 44 and a set of IFCs 46 with one or more physical network interfaces. Each of ChassisDs 54, 55 manages the physical configuration of the chassis for its assigned FPCs 42. Specifically, the control processes performed by the ChassisD include powering up hardware of router 50, recognizing the PFEs 44, and bringing PFEs 44 to a functional state to allow for setup of the logical components, and the like. Each of ChassisDs 54, 55 also sets up logical interfaces for PFEs 44.

Each of the RPDs 56, 59 processes the routing information to perform route selection and generate the forwarding information based on the selected routes. The forwarding information associates routes with specific next hops and corresponding interface ports for PFEs 44 of the FPCs 42 assigned to PSDs 38 and RSD 40. Each of the RPDs 56, 59 then installs forwarding tables into PFEs 44 based on the forwarding information via its associated kernel. Each of the RPDs 56, 59 may generate the forwarding information in the form of a radix tree having leaf nodes that represent destinations within the network. When forwarding a packet, PFE 44A, for example, traverses the radix tree to a leaf node based on information within a header of the packet to ultimately select a next hop and output interface to which to forward the packet. PFE 44A then forwards the packet to a neighboring router via the selected one of IFCs 46.

Routing engines 52, 58 may be implemented solely in software, or hardware, or may be implemented as a combination of software, hardware or firmware. For example, each of routing engines 52, 58 may include one or more processors which execute software instructions. In that case, each of routing engines 52, 58 may also include various software modules or daemons executing on a host operating system, and may include a non-transitory computer-readable storage device, such as computer memory or hard disk, for storing executable instructions.

A hardware environment of each of routing engines 52 and 58 may include a microprocessor (not shown in FIG. 2) that executes program instructions in order to execute both the kernel and the host operating system of the respective routing engine. The microprocessor may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of router 50 and control system 57, e.g., protocols. Routing engines 52, 58, in some examples, retrieve and execute the instructions from memory for these aspects.

In the example of conventional router 50 with control system 57 illustrated in FIG. 2, the control processes, including ChassisD and RPD processes, are spread across multiple hardware-independent REs 58 that each has its own host OS and kernel. In this case, if a software failure occurs in, e.g., RE 58A, the other control processes running in RE 58A will be taken down. The control processes running in the other REs 58 continue operating and maintain routing and forwarding functionality for their PSDs. Similarly, control unit 52 of router 50 maintains routing and forwarding functionality for the unassigned FPCs 42. The software failure in RE 58A may still cause a complete hardware failure of RE 58A, or, in the case where control system 57 includes one or more back-up REs, the software failure may trigger a hardware switchover to one of the back-up REs in control system 57.

For example, in the case where control system 57 includes redundant routing engine hardware, when the kernel of RE 58A experiences a kernel panic, RE 58A may perform a Graceful Routing Engine Switchover (GRES) to switch control of FPC 42A assigned to RE 58A in PSD 38A to a backup routing engine. The GRES solution requires control system 57 to include redundant hardware components and requires a sophisticated software implementation. The GRES solution does not separate the control processes running in each of REs 58, but instead provides redundancy to enable a relatively quick failover between RE pairs. The sophisticated software implementation may make the kernels in REs 58 unstable, potentially leading to more frequent occurrences of kernel panic. In addition, the hardware switchover may take down routing and forwarding functionality for FPC 42A assigned to RE 58A in PSD 38A for several seconds and result in substantial data loss.

In addition, the RSD-PSD system illustrated in FIG. 2 requires dedicated racks of RE hardware, i.e., control system 57, and a specific design of routing engine 52 in router 50. The RSD-PSD system also requires a separate physical switch 48 to facilitate communication between standalone router 50 and the plurality of REs 58 located out-of-box in control system 57.

Figure 3:
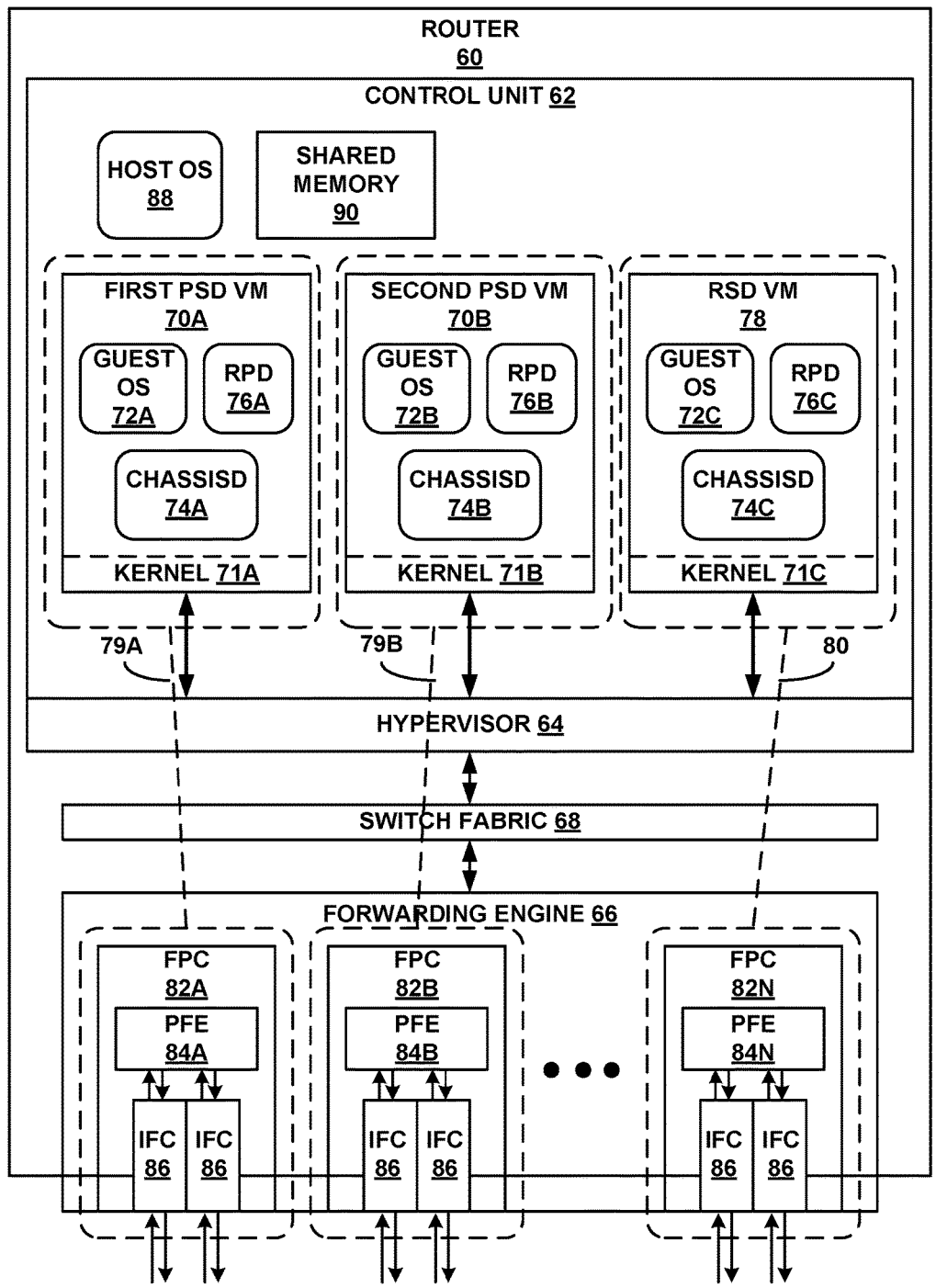
FIG. 3 is a block diagram illustrating an exemplary standalone router capable of separating control plane functions across multiple virtual machines in the standalone router in accordance with the techniques of this disclosure.

FIG. 3 is a block diagram illustrating an exemplary standalone router 60 capable of separating control plane functions across multiple virtual machines in router 60 in accordance with the techniques of this disclosure. In some cases, router 60 may operate substantially similar to router 4 in network 6 from FIG. 1. Several of the components included in router 60 operate similar to components within router 50 from FIG. 2. According to the techniques of this disclosure, however, router 60 is configured to separate control plane functions, particularly control processes for a RSD-PSD system, across multiple virtual machine instances executed within the same standalone router 60.

As illustrated in FIG. 3, router 60 includes a control unit 62 that provides control plane functionality for router 60, and a forwarding engine 66 that provides forwarding functionality for router 60. Router 60 may also include a switch fabric 68 that provides an internal interface between control unit 62 and packet forwarding components of forwarding engine 66. In addition, switch fabric 68 interconnects the packet forwarding components in forwarding engine 66, including a set of FPCs 82A-82N ("FPCs 82"), each of which includes at least one of PFEs 84A-84N ("PFEs 84") that send and receive traffic by a set of IFCs 86 that typically have one or more physical network interfaces (i.e., ports).

Packet forwarding components of forwarding engine 66, including FPCs 82 and components included in FPCs 82, and switch fabric 68 collectively provide a forwarding plane for forwarding transit network traffic. Although not shown in FIG. 3, PFEs 84 may each comprise a CPU, memory and one or more programmable packet-forwarding ASICs. Switch fabric 68 provides a high-speed interconnect for forwarding incoming data packets between PFEs 84 for transmission over a network.

Control unit 62 includes a hypervisor 64 that includes a kernel running over hardware of control unit 62 and a host OS 88 running over hypervisor 64. Hypervisor 64 may initialize and manage one or more virtual machines (VMs) within control unit 62 to provide operating environments for various protocols that perform control plane functions for router 60. As illustrated in FIG. 3, hypervisor 64 initializes a first PSD VM 70A, a second PSD VM 70B, and a RSD VM 78. In general, PSD VMs 70 and RSD VM 78 logically operate as a RSD-PSD system within a single physical standalone router 60. First PSD VM 70A and second PSD VM 70B operate as logically separate routing engines each assigned to one or more packet forwarding components of FPCs 82 in forwarding engine 66 to form separate logical devices, such as logical routers, and operate as PSDs 79A-79B ("PSDs 79"). For example, first PSD VM 70A is assigned to FPC 82A to form PSD 79A, and second PSD VM 70B is assigned to FPC 82B to form PSD 79B. RSD VM 78 operates as a routing engine for the unassigned FPCs 82 in forwarding engine 66, and operates as a RSD 80 by mapping assignments of the packet forwarding components of FPCs 82 to each of PSD VMs 70. For example, RSD VM 78 is linked to FPC 82N, which is not assigned to any of PSD VMs 70, to form RSD 80.

First PSD VM 70A includes its own kernel 71A with a first guest OS 72A over which to run one or more of the control processes, including RPD 76A and ChassisD 74A. Second PSD VM 70B includes its own kernel 71B with a second guest OS 72B over which to run one or more control processes, including RPD 76B and ChassisD 76B. RSD VM 78 includes its own kernel 71C with a third guest OS 72C over which to run one or more control processes, including RPD 76C and ChassisD 74C. In this configuration, each of guest OSs 72 may comprise a different operating system or a different version of the same operating system. In other examples, PSD VMs 70 and RSD VM 78 may comprise other daemons or software modules. In some cases, hypervisor 64 may execute more than two PSD VMs configured to run other daemons or software modules.

Kernels 71A-71C ("kernels 71") for the virtual machines executed in control unit 62 may comprise microkernels. Each of kernels 71 may comprise, for example, a UNIX operating system derivative such as Linux or Berkeley Software Distribution (BSD). Kernels 71 offer libraries and drivers by which control processes may interact with the underlying system. Each of kernels 71 comprises a kernel-level library, e.g., a sockets library, by which control processes or user-level libraries may interact with PFEs 84 assigned to the respective virtual machine.

Control processes running in PSD VMs 70 may communicate with control processes running in RSD VM 78 via a shared memory 90 managed by hypervisor 64. In other examples, the control processes running in PSD VMs 70 and RSD VM 78 may communicate using a shared network interface, a bridge or tap device, a virtual distributed switch, or another virtual machine communication interface managed by hypervisor 64. Control processes running in PSD VMs 70 and RSD VM 78 may each communicate with processes and hardware in the forwarding plane of router 60 via their individual kernels 71 and hypervisor 64.

Within PSD VMs 70 and RSD VM 78, each of ChassisDs 74 manages the physical configuration of the hardware components of FPCs 82 assigned to the respective virtual machine, including powering up hardware of router 60, recognizing the PFEs 84, bringing PFEs 84 to a functional state to allow for setup of the logical components, and the like. More specifically, ChassisD 74A in first PSD VM 70A sets up logical interfaces for PFE 84A of the FPC 82A assigned to first PSD VM 70A in PSD 79A via kernel 71A and hypervisor 64. ChassisD 74B in second PSD VM 70B sets up logical interfaces for PFE 84B of FPC 82B assigned to second PSD VM 70B in PSD 79B via kernel 71B and hypervisor 64. Additionally, ChassisD 74C in RSD VM 78 sets up logical interfaces for PFE 84N of the unassigned FPC 82N in RSD 80 via kernel 71C and hypervisor 64.

In a conventional router, such as router 50 from FIG. 2, a ChassisD interacts with the host OS to access drivers to manage the hardware of router 50. According to the techniques of this disclosure, control unit 62 may emulate hardware in each of PSD VMs 70 and RSD VM 78 to provide control of the hardware of router 60 directly to guest OSs 72, avoiding interaction with host OS 88 and hypervisor 64. For example, ChassisD 74A in first PSD VM 70A manages at least a portion of the hardware of router 60, but instead of going through hypervisor 64 to interact with host OS 88 to manage the hardware, control unit 62 may emulate the hardware of router 60 within first PSD VM 70A to provide control over the hardware to guest OS 72A. In this way, ChassisD 74A interacts with guest OS 72A to manage the actual hardware of router 60 that is assigned to first PSD VM 70A via emulated hardware (not shown in FIG. 3). The emulated hardware effectively provides a hypervisor bypass to allow ChassisD 74A in first PSD VM 70A to directly manage the actual hardware of router 60, including the packet forwarding components of FPC 82A assigned to first PSD VM 70A in PSD 79A.

Within PSD VMs 70 and RSD VM 78, each of RPDs 76 performs routing control processes to update routing information, generate forwarding information, and install forwarding tables into PFEs 84 for the FPCs 82 assigned to the respective virtual machine. More specifically, RPD 76A in first PSD VM 70A performs routing control processes for FPC 82A assigned to first PSD VM 70A in PSD 79A and installs the forwarding tables into PFE 84A for the assigned FPC 82A via kernel 71A and hypervisor 64. RPD 76B in second PSD VM 70B performs routing control processes for FPC 82B assigned to second PSD VM 70B in PSD 79B and installs the forwarding tables into PFE 84B for the assigned FPC 82B via kernel 71B and hypervisor 64. Additionally, RPD 76C in RSD VM 78 performs routing control processes for the unassigned FPC 82N in RSD 80 and installs the forwarding tables into PFE 84N for the unassigned FPC 82N via kernel 71C and hypervisor 64.

In the example illustrated in FIG. 3, when a software failure causes a kernel panic in first PSD VM 70A, only kernel 71A panics and first PSD VM 70A may perform a software failover without affecting the operation of control processes in second PSD VM 70B or RSD VM 78. For example, in the case of a software failure in first PSD VM 70A, hypervisor 64 may initialize another PSD VM including a kernel, a guest OS, a ChassisD and a RPD to operate as a backup virtual machine in which to run the routing control process and chassis management process for FPCs 82 assigned to first PSD VM 70A. In this case, hypervisor 64 may switch control of the control processes to the new PSD VM and eliminate the failed first PSD VM 70A. In other examples, after a software failure in first PSD VM 70A, hypervisor 64 may bring down first PSD VM 70A and then re-initialize first PSD VM 70A to regain control of the routing functionality and chassis management for FPC 82A assigned to first PSD VM 70A.

In some cases, upon a software failure in first PSD VM 70A, hypervisor 64 may switch control of the control processes for the FPC 82A assigned to first PSD VM 70A in PSD 79A to RSD VM 78 in RSD 80. As described above, RSD VM 78 performs control processes for any unassigned FPCs 82 in router 60. In addition, RSD VM 78 may be more stable than PSD VMs 70 because RSD VM 78 only performs routing control processes for the small number of unassigned FPCs 82. A robust fallback mechanism, therefore, exists such that when all the PSD VMs 70 in router 60 fail, RSD VM 78 may take control of the entire forwarding plane.

In any case, the software failure and failover process of first PSD VM 70A does not affect the operation of control processes in second PSD VM 70B or RSD VM 78. While hypervisor 64 is initializing new virtual machines and performing switchovers for first PSD VM 70A, second PSD VM 70B maintains control of routing functionally and chassis management for FPC 82B assigned to second PSD VM 70B, and RSD VM 78 maintains control of routing functionality and chassis management for the unassigned FPCs 82. By separating the control plane functions across multiple virtual machines, software failures in one of the virtual machines do not dictate costly hardware switchovers that require redundant hardware and sophisticated software implementations in router 60.

In addition, by running the separate control plane functions across multiple virtual machine instances, control unit 62 may migrate at least one of the virtual machines, e.g., second PSD VM 70B, to an external routing engine coupled to router 60. In this way, router 60 may offload several control processes running in the virtual machines to external routing engines without introducing the connectivity issues describe above with respect to the conventional RSD-PSD system from FIG. 2. For example, control processes in second PSD VM 70B may continue to communicate with control processes in RSD VM 78 via shared memory 90, or a shared network interface, a bridge or tap device, a virtual distributed switch, or another virtual machine communication interface managed by hypervisor 64, even if second PSD VM 70B is migrated out of control unit 62 and into an external routing engine. The virtual machines enable direct communication between the control plane processes running in physically separate devices without requiring a physical external switch, such as physical switch 48 from FIG. 2.

RSD VM 78 needs to control certain devices, such as a switch control board (SCB) and an in-chassis switch, of router 60 in order to perform as the RSD of the virtual RSD-PSD system within router 60. According to the techniques, control unit 62 may use a directed access virtualization (VT-d) method to assign a peripheral component interconnect (PCI) device to RSD VM 78 such that guest OS 72C in RSD VM 78 can have direct control over the PCI device. If VT-d is not available in control unit 62, drivers for the devices to be controlled, e.g., the PCI device, are ported to host OS 88 and RSD VM 78 may be paravirtualized using emulated hardware to access the PCI device.

In addition, in the illustrated example of FIG. 3, the physical switch required for RSD-PSD connectivity in a conventional RSD-PSD system illustrated in FIG. 2 may be eliminated because, according to the techniques, RSD VM 78 and PSD VMs 70 run in control plane 62 of a single physical standalone router 60. A bridge or tap can be used to bind internal Ethernet interfaces, i.e., fxp interfaces, of PSD VMs 70 to internal Ethernet interfaces, i.e., fxp interfaces, or other internal interfaces between a routing engine and control board, i.e., em0 and em1 interfaces, of RSD VM 78. For example, the interfaces of RSD VM 78 and PSD VMs 70 may be bound via shared memory 90 or another virtual machine communication interface. In the case where a virtual local area network (VLAN) is used, a conventional RSD-PSD system illustrated in FIG. 2 requires a software switch, such as a virtual distributed Ethernet (VDE) switch, be attached to the RSD and PSD interfaces. According to the techniques, the interfaces of RSD VM 78 and PSD VMs 70 are exposed to each other and no physical switch, or software switch for the VLAN case, is required. This may result in a simpler implementation of a RSD-PSD system.

The architecture of network device 60 illustrated in FIG. 3 is shown for exemplary purposes only. The disclosure is not limited to this architecture. In other embodiments, network device 60 may be configured in a variety of ways. In one embodiment, for example, some of the functionally of control unit 62 may be distributed within PFEs 84. The operating environment of control unit 62 may be implemented solely in software or hardware, or may be implemented as a combination of software, hardware or firmware. For example, control unit 62 may include one or more processors that execute software instructions. In that case, control unit 62 may include various software modules or daemons executing on an operating system, e.g., a virtual machine instance, and may include a non-transitory computer-readable storage device, such as computer memory or hard disk, for storing executable instructions.

A hardware environment of control unit 62 may include a microprocessor (not shown in FIG. 3) that executes program instructions in order to execute both hypervisor 64 including the kernel and the virtual machine operating environments including kernels 71. The microprocessor may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of router 60, e.g., protocols. Control unit 62, in some examples, retrieves and executes the instructions from memory for these aspects.

Figure 4:
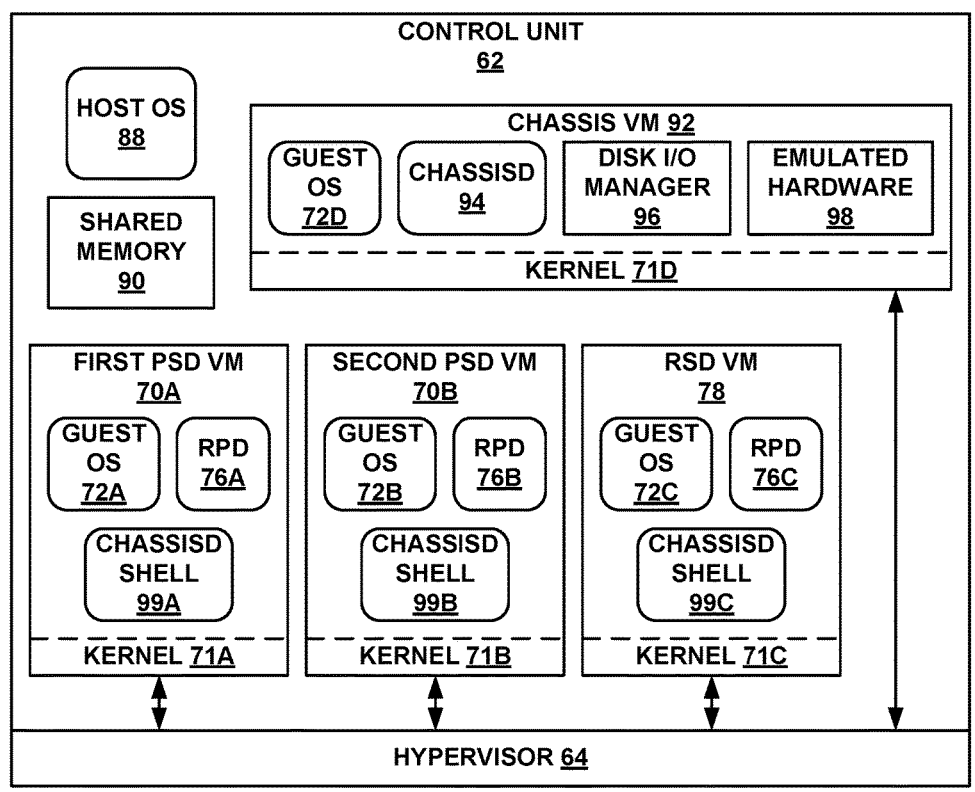
FIG. 4 is a block diagram illustrating a control unit of the router from FIG. 3 with a separate chassis virtual machine configured to perform chassis management for each of the virtual machines in the router.

FIG. 4 is a block diagram illustrating control unit 62 of router 60 from FIG. 3 with a separate chassis VM 92 configured to perform chassis management for each of the virtual machines 70, 78 in router 60. As illustrated in FIG. 4, hypervisor 64 initializes first PSD VM 70A, second PSD VM 70B, RSD VM 78, and chassis VM 92. As described above, PSD VMs 70 and RSD VM 78 logically operate as a RSD-PSD system within a single physical standalone router 60. Chassis VM 92 includes a ChassisD 94 that performs a chassis management process to manage packet forwarding components for each of the logically separate routers formed by PSD VMs 70 and RSD VM 78.

First PSD VM 70A includes its own kernel 71A with a first guest OS 72A over which to run a RPD 76A and a ChassisD shell 99A. Second PSD VM 70B includes its own kernel 71B with a second guest OS 72B over which to run a RPD 76B and a ChassisD shell 99B. RSD VM 78 includes its own kernel 71C with a third guest OS 72C over which to run a RPD 76C and a ChassisD shell 99C. Chassis VM 92 includes its own kernel 71D with a fourth guest OS 72D over which to run a ChassisD 94, a disk input/output (I/O) manager 96, and emulated hardware 98. ChassisD shells 99A-99C facilitate management of the packet forwarding components via ChassisD 94 running in chassis VM 92. In this configuration, each of guest OSs 72 may comprise a different operating system or a different version of the same operating system.

The routing control processes running in PSD VMs 70 and RSD VM 78 may communicate with the chassis management process running in chassis VM 92 via a shared memory 90, or a shared network interface, a bridge or tap device, a virtual distributed switch, or another virtual machine communication interface managed by hypervisor 64. In other examples, the routing control processes running in each of PSD VMs 70 and RSD VM 78 may communicate with ChassisD 94 in chassis VM 96 via ChassisD shells 99. Control processes running in PSD VMs 70, RSD VM 78, and chassis VM 92 may each communicate with processes and hardware in the forwarding plane of router 60 via their individual kernels 71 and hypervisor 64.

Within chassis VM 92, ChassisD 94 manages the physical configuration of the hardware components of FPCs 82 that are either assigned to any of PSD VMs 70 or unassigned and linked to RSD VM 78. ChassisD 94 performs chassis management processes, including powering up hardware of router 60, recognizing the PFEs 84, bringing PFEs 84 to a functional state to allow for setup of the logical components, and the like. More specifically, ChassisD 94 in chassis VM 92 sets up logical interfaces for PFEs 84 of the FPCs 82 assigned to first PSD VM 70A via kernel 71D and hypervisor 64. ChassisD 94 also sets up logical interfaces for PFEs 84 of the FPCs 82 assigned to second PSD VM 70B via kernel 71D and hypervisor 64. Additionally, ChassisD 94 sets up logical interfaces for PFEs 84 of the unassigned FPCs 82 linked to RSD VM 78 via kernel 71D and hypervisor 64.

According to the techniques of this disclosure, control unit 62 may emulate hardware in chassis VM 92 to provide control of the hardware of router 60 directly to guest OS 72D, avoiding interaction with host OS 88 and hypervisor 64. For example, ChassisD 94 in chassis VM 92 manages the hardware of router 60, but instead of going through hypervisor 64 to interact with host OS 88 to manage the hardware, control unit 62 may emulate the hardware of router 60 within chassis VM 92 to provide control over the hardware to guest OS 72D. In this way, ChassisD 94 interacts with guest OS 72D to manage the actual hardware of router 60 via emulated hardware 98. Emulated hardware 98 effectively provides a hypervisor bypass to allow ChassisD 94 in chassis VM 92 to directly manage the actual hardware, including the packet forwarding components of FPCs 82 assigned to any of PSD VMs 70 or unassigned and linked to RSD VM 78.

Within PSD VMs 70 and RSD VM 78, each of RPDs 76 performs routing control processes to update routing information, generate forwarding information, and install forwarding tables into PFEs 84 for the FPCs 82 assigned to the respective virtual machine. More specifically, RPD 76A in first PSD VM 70A receives interface information from ChassisD 94 in chassis VM 92 for the FPCs 82 assigned to first PSD VM 70A. Based on the interface information, RPD 76A then performs routing control processes for the assigned FPCs 82 and installs the forwarding tables into PFEs 84 for the assigned FPCs 82 via kernel 71A and hypervisor 64. RPD 76B in second PSD VM 70B receives interface information from ChassisD 94 in chassis VM 92 for the FPCs 82 assigned to second PSD VM 70B, performs routing control processes for the assigned FPCs 82 based on the interface information, and installs the forwarding tables into PFEs 84 for the assigned FPCs 82 via kernel 71B and hypervisor 64. Additionally, RPD 76C in RSD VM 78 receives interface information from ChassisD 94 in chassis VM 92 for the unassigned FPCs 82, performs routing control processes for the unassigned FPCs 82 based on the interface information, and installs the forwarding tables into PFEs 84 for the unassigned FPCs 82 via kernel 71C and hypervisor 64.

In the example illustrated in FIG. 4, when a software failure causes a kernel panic in first PSD VM 70A, only kernel 71A panics and first PSD VM 70A may perform a software failover without affecting the operation of routing control process in second PSD VM 70B and RSD VM 78, or the chassis management process in chassis VM 92. As described above, in the case of a software failure in first PSD VM 70A, hypervisor 64 may switch control of the control processes to a newly initialized PSD VM or to RSD VM 78, or may re-initialize first PSD VM 70A to regain control of the routing functionality for the FPCs assigned to first PSD VM 70A. While hypervisor 64 is performing the failover for first PSD VM 70A, chassis VM 93 maintains control of ChassisD 94 to continue managing the FPCs 82 assigned to first PSD VM 70A based on the most resent state of the forwarding information before the software failover of first PSD VM 70A.

In some cases, the techniques of separating routing control processes and chassis management processes using virtual machines may be applied to a single physical or logical routing engine of a router, instead of the illustrated multiple logical router case of the virtual RSD-PSD system. As an example, a routing engine may include a routing VM configured to perform the routing control processes for the router and a chassis VM configured to perform the chassis management processes for the router. The routing VM and the chassis VM may communicate with each other via a shared memory, a shared network interface, a bridge or tap device, a virtual distributed switch, or another virtual machine communication interface managed by a hypervisor, or via control process shells executed in each of the VMs. In this case, a software failure caused by the routing VM will not affect the chassis management processes in the chassis VM, which may avoid costly hardware switchovers.

Additionally, in the illustrated example, chassis VM 92 is configured to perform disk input/output (I/O) for both the chassis management process and the routing control processes performed in PSD VMs 70 and RSD VM 78. Disk I/O may need to be performed to store and/or retrieve data, such as software packages, logs, configurations, and dumps, from a storage disk, such as a hard disk, of router 60. When hypervisor 64 runs multiple virtual machines, e.g., first and second PSD VMs 70, RSD VM 78, and chassis VM 92, disk I/O may become a performance bottleneck with each of the virtual machines attempting to access the same hard disk. According to the techniques of this disclosure, control unit 62 may use a single root/multiple root I/O in which only one guest OS in a single virtual machine performs disk I/O for all control processing running in control unit 62.

In the example illustrated in FIG. 4, chassis VM 92 includes a disk I/O manager 96. In this example, guest OS 72D of chassis VM 92 uses disk I/O manager 96 to perform disk I/O for data generated by ChassisD 94. Disk I/O manager 96 may access the hard disk to perform the input and output operations via kernel 71D of chassis VM 92 and hypervisor 64. As shown in FIG. 4, only chassis VM 92 includes disk I/O manager 96 and PSD VMs 70 and RSD VM 78 do not include a disk I/O mechanism. In other examples, disk I/O manager may be included in one of the other virtual machines executed in control unit 62 of router 60 in order to perform disk I/O for all data generated by control processes executed in control unit 62.

According to the techniques, PSD VMs 70 and RSD VM 78 use disk I/O manager 96 within chassis VM 92 to perform disk I/O for data generated by the routing control processes performed by PSD VMs 70 and RSD VM 78. More specifically, guest OS 72A of first PSD VM 70A interacts with host OS 88 of control unit 62 to move data generated by RPD 76A to disk I/O manager 96 controlled by guest OS 72D of chassis VM 92. Once the data is moved from first PSD VM 70A to chassis VM 92, guest OS 72D of chassis VM 92 uses disk I/O manager 96 to perform disk I/O for data generated by RPD 76A. Again, disk I/O manager 96 may access the hard disk to perform the input and output operations via kernel 71D of chassis VM 92 and hypervisor 64.

In the case of the virtual RSD-PSD system described in this disclosure, the disk I/O bottleneck problem may turn into a network I/O problem through mounting network file system (NFS) traffic volume between RSD VM 78 and PSD VMs 70. The solution describe above of having only chassis VM 92 perform disk I/O using disk I/O manager 96, may avoid the disk I/O bottleneck turning into a network I/O problem.

Figure 5:
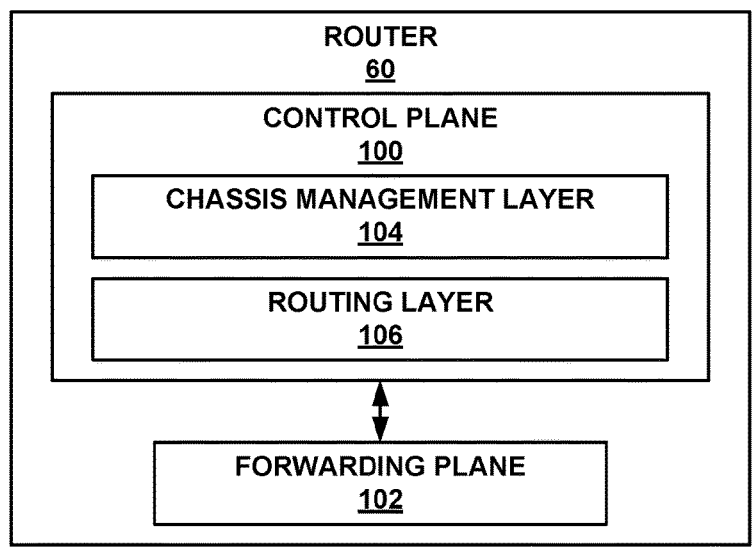
FIG. 5 is a conceptual diagram illustrating the router from FIG. 3 with a forwarding plane, and a control plane including a separate routing layer and chassis management layer.

FIG. 5 is a conceptual diagram illustrating router 60 from FIG. 3 with a forwarding plane 102, and a control plane 100 including a separate chassis management layer 104 and a routing layer 106. In a conventional routing engine, such as routing engine 52 in router 50 or any of REs 58 in control system 57 from FIG. 2, all control processes are performed in a single layer with no separation. As described above, in the conventional routing engine, if a failure occurs due to one process performed in the control plane layer of the routing engine, then the entire control plane layer may fail including all the other control processes performing in the layer.

According to the techniques, control plane 100 of router 60 may be separated into chassis management layer 104 and routing layer 106. Control plane 100 may be divided into separate layers using multiple virtual machine instances, one or more for each layer, as described with respect to FIG. 4. In this way, if a failure occurs in one of RSD VM 78 or PSD VMs 70, the failure is confined to routing layer 106 and does not affect the control processes running in any other layers, such as the chassis management process of chassis VM 92 running in chassis management layer 104. In other examples, control plane 100 may include additional separated layers in which additional control processes may be performed separately from the other control processes.

Figure 6:
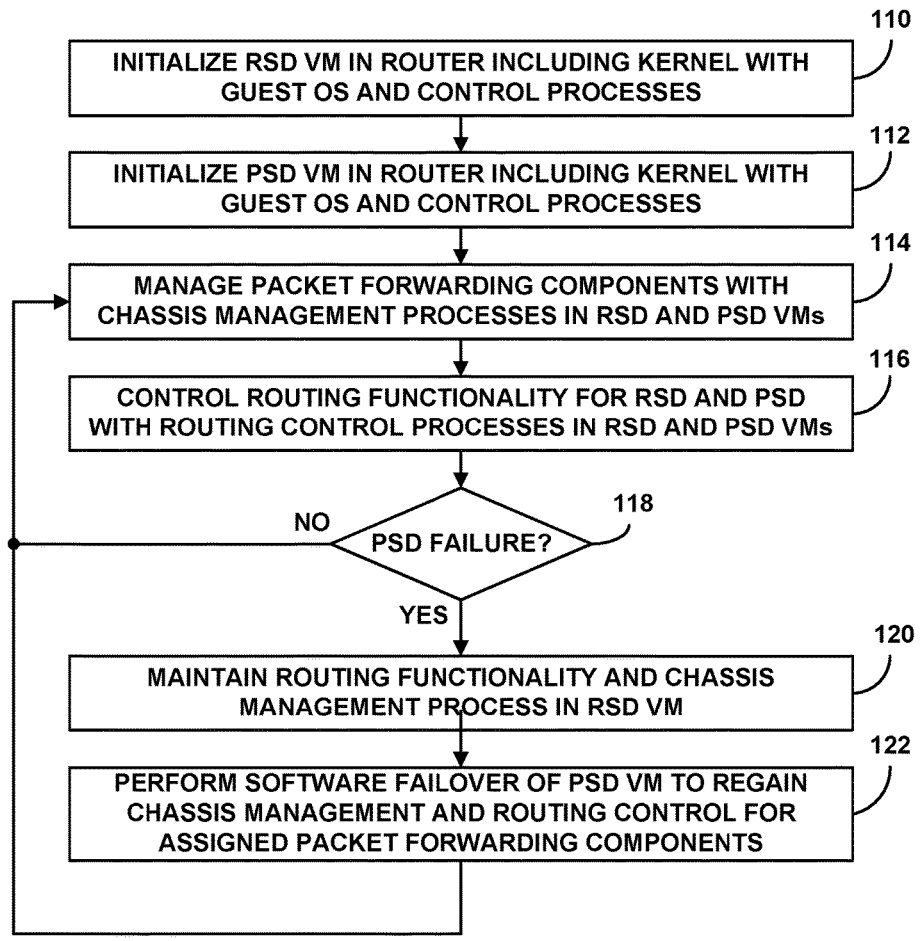
FIG. 6 is a flowchart illustrating an exemplary operation of separating control plane functions within a standalone router using virtual machines in accordance with the techniques of this disclosure.

FIG. 6 is a flowchart illustrating an exemplary operation of separating control plane functions within a standalone router using virtual machines in accordance with the techniques of this disclosure. The example operation is described with respect to router 60 from FIG. 3.

According to the techniques of this disclosure, hypervisor 64 initializes RSD VM 78 in router 60 including kernel 71C with guest OS 72C, and RPD 76C (110). Hypervisor 64 also initializes a first PSD VM 70A in router 60 including kernel 71A with guest OS 72A, and ChassisD 74A (112). In some examples, as illustrated in FIG. 3, hypervisor 64 may initialize additional PSD VMS, including second PSD VM 70B. Upon initializing first PSD VM 70A, ChassisD 74A begins managing packet forwarding components of the FPCs 82 assigned to first PSD VM 70A (114). RPD 76A then begins controlling routing functionality for the FPCs 82 assigned to first PSD VM 70A (116). Moreover, upon initializing RSD VM 78, ChassisD 74C begins managing packet forwarding components of the unassigned FPCs 82, and RPD 76C begins controlling routing functionality for any unassigned FPCs 82 (114, 116).

As long as no software failure occurs in first PSD VM 70A (NO branch of 118), first PSD VM 70A continues to manage the packet forwarding components (114) and control the routing functionality (116) for the FPCs 82 assigned to first PSD VM 70A, and RSD VM 78 continues to manage the packet forwarding components (114) and control the routing functionality (116) for the unassigned FPCs 82. When a software failure occurs in first PSD VM 70A (YES branch of 118), RPD 76C and ChassisD 74C are maintained in RSD VM 78 and continue to manage the packet forwarding components and control the routing functionality for the unassigned FPCs 82 (120). In some cases, upon failure of first PSD VM 70A, RSD VM 78 may take over the FPCs 82 assigned to first PSD VM 70A until a failover of first PSD VM 70A occurs. Similarly, in the case where second PSD VM 70B is initialized in control unit 62 of router 60, the failure of first PSD VM 70A does not affect the operation of control processes within second PSD VM 70B.

The software failure in first PSD VM 70A, however, causes first PSD 70A to perform a software failover to regain control of the management of the packet forwarding components and routing functionality for the FPCs 82 assigned to first PSD VM 70A (122). In this way, separating the control functions across multiple virtual machines enables routing and forwarding functionality of at least some of FPCs 82 in router 60 to continue even if the routing and forwarding functionality of the FPCs 82 assigned to first PSD VM 70A temporarily stops when first PSD VM 70A fails. After the software failover, first PSD VM 70A returns to managing the packet forwarding components of the FPCs 82 assigned to first PSD VM 70A (114), and controlling the routing functionality for the FPCs 82 assigned to first PSD VM 70A (116).

Figure 7:
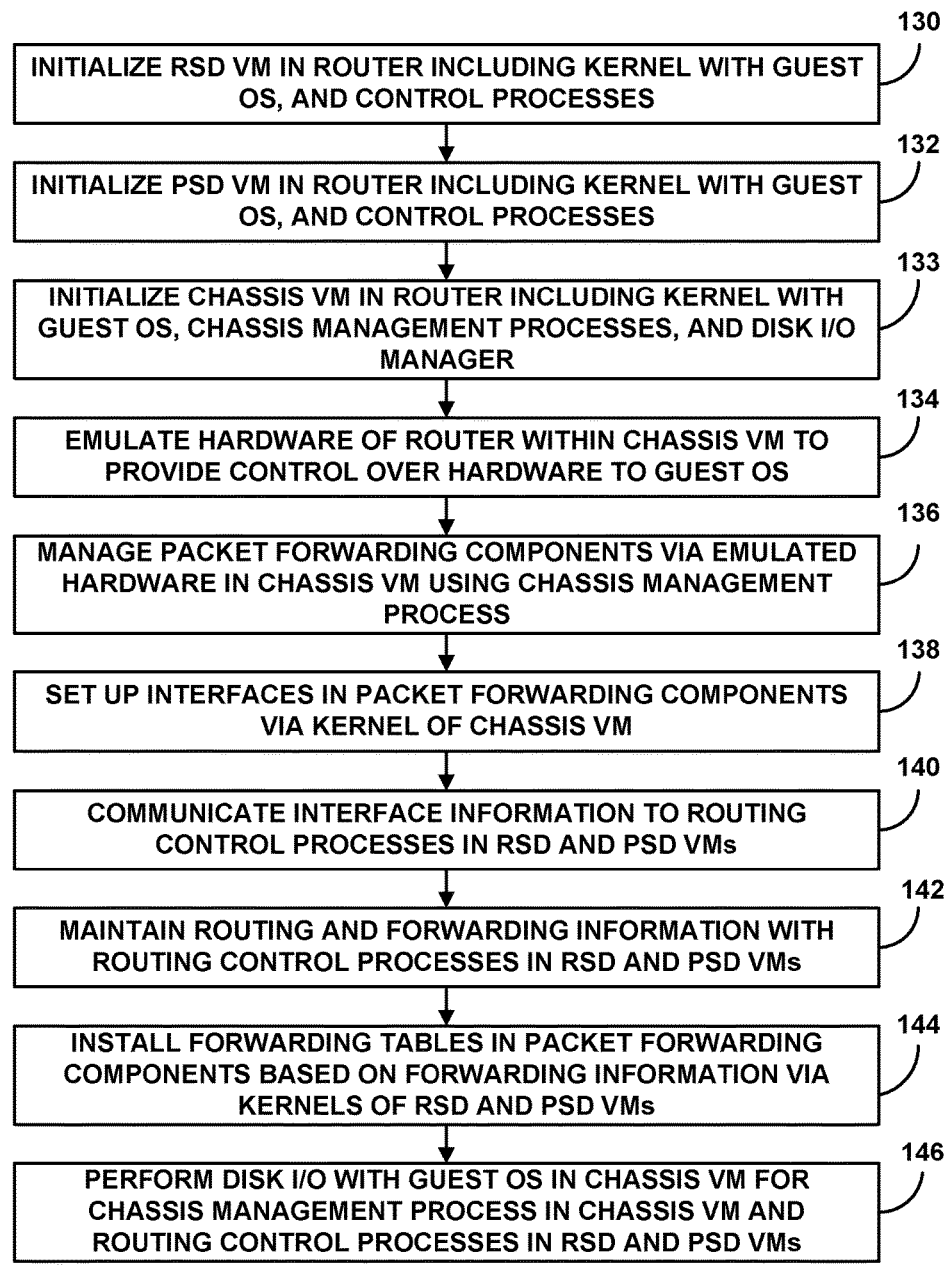
FIG. 7 is a flowchart illustrating an exemplary operation of performing a chassis management process in a separate chassis virtual machine for each virtual machine in a standalone router in accordance with the techniques of this disclosure.

FIG. 7 is a flowchart illustrating an exemplary operation of performing a chassis management process in a separate chassis virtual machine for each virtual machine in a standalone router in accordance with the techniques of this disclosure. The example operation is described with respect to router 60 from FIG. 3 and FIG. 4.

According to the techniques of this disclosure, hypervisor 64 initializes RSD VM 78 in router 60 including kernel 71C with guest OS 72C, RPD 76C, and ChassisD shell 99C (130). Hypervisor 64 also initializes first PSD VM 70A in router 60 including kernel 71A with guest OS 72A, RPD 76A, and ChassisD shell 99A (132). In some examples, as illustrated in FIGS. 3 and 4, hypervisor 64 may initialize additional PSD VMs, including second PSD VM 70B. According to the techniques, hypervisor 64 also initializes chassis VM 92 in router 60 including kernel 71D with guest OS 72D, ChassisD 94, and disk I/O manager 96 (133).

According to the techniques, ChassisD 94 in chassis VM 92 manages the physical configuration of hardware in the chassis including powering up router 60, recognizing the PFEs 84, bringing PFEs 84 to a functional state to allow for setup of the logical components, and the like for all of the logically separate routers created by the virtual RSD-PSD system described in this disclosure. In the example illustrated in FIG. 4, first PSD VM 70A includes a ChassisD shell 99A to facilitate the centralized management of the packet forwarding components of the FPCs 82 assigned to first PSD VM 70A via ChassisD 94 running in chassis VM 92. Similarly, RSD VM 78 includes a ChassisD shell 99C to facilitate the centralized management of the packet forwarding components of the unassigned FPCs 82 via ChassisD 94 running in chassis VM 92.

Control unit 62 emulates hardware of router 60 within chassis VM 92 to provide control over the hardware to guest OS 72D of chassis VM 92 (134). ChassisD 94 then manages the packet forwarding components via emulated hardware 98 in chassis VM 92 (136). More specifically, ChassisD 94 interacts with guest OS 72D to manage the actual hardware of router 60 via emulated hardware 98. Emulated hardware 98 effectively provides a hypervisor bypass to allow ChassisD 94 to directly manage the actual hardware of router 60, including the packet forwarding components in forwarding engine 66.

ChassisD 94 sets up interfaces in the packet forwarding components assigned to first PSD VM 70A via kernel 71D of chassis VM 92 (138). Similarly, ChassisD 94 also sets up interfaces in the unassigned packet forwarding components linked to RSD VM 78 via kernel 71D of chassis VM 92 (138). ChassisD 94 in chassis VM 92 communicates interface information to RPD 76A in first PSD VM 70A for the FPCs 82 assigned to first PSD VM 70A, and communicates interface information to RPD 76C in RSD VM 78 for the unassigned FPCs 82 (140).

Based on the interface information, RSD VM 78 and first PSD VM 70A maintain routing information and forwarding information for the FPCs 82 assigned to each of the virtual machines (142). For example, RPD 76A in first PSD VM 70A may exchange routing information with neighboring routers in a network and, based on the learned routing information, update routing information for the FPCs 82 assigned to first PSD VM 70A to describe routes through the network. RPD 76A then processes the routing information to perform route selection and generate forwarding information based on the selected routes. The forwarding information associates routes with specific next hops and corresponding interface ports for PFEs 84 of the FPCs 82 assigned to first PSD VM 70A and RSD VM 78.

RPD 76A of first PSD VM 70A then installs forwarding tables in the PFEs 84 assigned to first PSD VM 70A based on the forwarding information via kernel 71A of first PSD VM 70A (144). Similarly, RPD 76C of RSD VM 78 learns routing information, generates forwarding information based on the routing information, and then installs forwarding tables in the unassigned PFEs 84 based on the forwarding information via kernel 71C of RSD VM 78 (144).

Additionally, guest OS 72D of chassis VM 92 uses disk I/O manager 96 to perform disk I/O for data generated by ChassisD 94 in chassis VM 92 and for data generated by RPD 76A in first PSD VM 70A or RPD 76C in RSD VM 78 (146). For data generated by RPD 76A, guest OS 72A of first PSD VM 70A interacts with host OS 88 of control unit 62 to move data generated by RPD 76A to disk I/O manager 96 controlled by guest OS 72C of chassis VM 92. Disk I/O manager 96 may access the hard disk to perform the input and output operations via kernel 71D of chassis VM 92 and hypervisor 64.

Various examples have been described. These and other examples are within the scope of the following claims.

The invention claimed is:

1. A method comprising:
   initializing a first virtual machine in a control unit of a network device that operates as a logically separate routing engine assigned to at least one of a plurality of packet forwarding components of the network device to form a logical device, the first virtual machine including a first kernel with a first guest operating system;
   initializing a second virtual machine in the control unit of the network device that operates as a routing engine for the network device and maps the at least one of the plurality of packet forwarding components to the first virtual machine, the second virtual machine including a second kernel with a second guest operating system;
   executing, by the first virtual machine, a first routing control process to control routing functionality for the logical device, and a first chassis management process to manage the at least one of the plurality of packet forwarding components assigned to the first virtual machine;
   executing, by the second virtual machine, a second routing control process to control routing functionality for the network device, and a second chassis management process to manage other of the plurality of packet forwarding components of the network device; and
   upon detecting a failure of the first virtual machine, performing a failover of the first virtual machine without disrupting performance of the second routing control process and the second chassis management process of the second virtual machine.

2. The method of claim 1, further comprising:
   emulating hardware of the network device in the first virtual machine and the second virtual machine; and
   managing the plurality of packet forwarding components of the network device via the emulated hardware in the first virtual machine using the first chassis management process and the second virtual machine using the second chassis management process.

3. The method of claim 2, wherein emulating the hardware in the first virtual machine and the second virtual machines generates a hypervisor bypass to provide control over the hardware to the first guest operating system in the first virtual machine and the second guest operating system in the second virtual machine.

4. The method of claim 1, further comprising communicating data between the first virtual machine and the second virtual machine via one of a shared memory, a shared network interface, a bridge or tap device, and a virtual distributed switch included in the control unit of the network device.

5. The method of claim 1, further comprising performing, by the second guest operating system included in the second virtual machine, data storage input and output operations for data generated by the first virtual machine and data generated by the second virtual machine.

6. The method of claim 1, further comprising:
   setting up, according to the first chassis management process and via the first kernel of the first virtual machine, logical interfaces in the at least one of the plurality of packet forwarding components assigned to the first virtual machine;
   maintaining, according to the first routing control process of the first virtual machine, routing and forwarding information for the logical device; and
   installing, via the first kernel of the first virtual machine, the forwarding information into forwarding tables in the at least one of the plurality of packet forwarding components assigned to the first virtual machine.

7. A network device comprising:
   a forwarding engine including a plurality of packet forwarding components; and
   a control unit including one or more processors in communication with the forwarding engine, the one or more processors being configured to:
      initialize a first virtual machine in the control unit that operates as a logically separate routing engine assigned to at least one of the plurality of packet forwarding components in the forwarding engine to form a logical device, the first virtual machine including a first kernel with a first guest operating system, initialize a second virtual machine in the control unit that operates as a routing engine for the network device and maps the at least one of the plurality of packet forwarding components to the first virtual machine, the second virtual machine including a second kernel with a second guest operating system;

execute, by the first virtual machine, a first routing control process to control routing functionality for the logical device, and a first chassis management process to manage the at least one of the plurality of packet forwarding components assigned to the first virtual machine;

execute, by the second virtual machine, a second routing control process to control routing functionality for the network device, and a second chassis management process to manage other of the plurality of packet forwarding components of the network device; and upon detecting a failure of the first virtual machine, perform a failover of the first virtual machine without disrupting performance of the second routing control process and the second chassis management process of the second virtual machine.

8. The device of claim 7, wherein the one or more processors are further configured to:
   emulate hardware of the network device in the first virtual machine and the second virtual machine; and
   manage the plurality of packet forwarding components of the network device via the emulated hardware in the first virtual machine using the first chassis management process and the second virtual machine using the second chassis management process.

9. The device of claim 8, wherein, by emulating the hardware in the first virtual machine and the second virtual machines, the one or more processors generate a hypervisor bypass to provide control over the hardware to the first guest operating system in the first virtual machine and the second guest operating system in the second virtual machine.

10. The device of claim 7, wherein the one or more processors are configured to communicate data between the first virtual machine and the second virtual machine via one of a shared memory, a shared network interface, a bridge or tap device, and a virtual distributed switch included in the control unit of the network device.

11. The device of claim 7, wherein the one or more processors are configured to perform, by the second guest operating system included in the second virtual machine, data storage input and output operations for data generated by the first virtual machine and data generated by the second virtual machine.

12. The device of claim 7, wherein the one or more processors are configured to:
   set up, according to the first chassis management process and via the first kernel of the first virtual machine, logical interfaces in the at least one of the plurality of packet forwarding components assigned to the first virtual machine;
   maintain, according to the first routing control process of the first virtual machine, routing and forwarding information for the logical device; and
   install, via the first kernel of the first virtual machine, the forwarding information into forwarding tables in the at least one of the plurality of packet forwarding components assigned to the first virtual machine.

13. A non-transitory computer-readable medium storing instructions that when executed cause one or more processors to:
   initialize a first virtual machine in a control unit of a network device that operates as a logically separate routing engine assigned to at least one of a plurality of packet forwarding components of the network device to form a logical device, the first virtual machine including a first kernel with a first guest operating system;
   initialize a second virtual machine in the control unit of the network device that operates as a routing engine for the network device and maps the at least one of the plurality of packet forwarding components to the first virtual machine, the second virtual machine including a second kernel with a second guest operating system;
   execute, by the first virtual machine, a first routing control process to control routing functionality for the logical device, and a first chassis management process to manage the at least one of the plurality of packet forwarding components assigned to the first virtual machine;
   execute, by the second virtual machine, a second routing control process to control routing functionality for the network device, and a second chassis management process to manage other of the plurality of packet forwarding components of the network device; and
   upon detecting a failure of the first virtual machine, perform a failover of the first virtual machine without disrupting performance of the second routing control process and the second chassis management process of the second virtual machine.

14. The non-transitory computer-readable medium of claim 13, further comprising instructions that when executed cause the one or more processors to:
   emulate hardware of the network device in the first virtual machine and the second virtual machine; and
   manage the plurality of packet forwarding components of the network device via the emulated hardware in the first virtual machine using the first chassis management process and the second virtual machine using the second chassis management process.

15. The non-transitory computer-readable medium of claim 14, wherein, by emulating the hardware in the first virtual machine and the second virtual machines, the instructions cause the one or more processors to generate a hypervisor bypass to provide control over the hardware to the first guest operating system in the first virtual machine and the second guest operating system in the second virtual machine.

16. The non-transitory computer-readable medium of claim 13, further comprising instructions that when executed cause the one or more processors to communicate data between the first virtual machine and the second virtual machine via one of a shared memory, a shared network interface, a bridge or tap device, and a virtual distributed switch included in the control unit of the network device.

17. The non-transitory computer-readable medium of claim 13, further comprising instructions that when executed cause the one or more processors to perform, by the second guest operating system included in the second virtual machine, data storage input and output operations for data generated by the first virtual machine and data generated by the second virtual machine.

18. The non-transitory computer-readable medium of claim 13, further comprising instructions that when executed cause the one or more processors to:

set up, according to the first chassis management process and via the first kernel of the first virtual machine, logical interfaces in the at least one of the plurality of packet forwarding components assigned to the first virtual machine;

maintain, according to the first routing control process of the first virtual machine, routing and forwarding information for the logical device; and install, via the first kernel of the first virtual machine, the forwarding information into forwarding tables in the at least one of the plurality of packet forwarding components assigned to the first virtual machine.

\* \* \* \* \*